3,393,173
METHOD OF CALKING WITH A PLASTICIZED
POLYCHLOROPRENE COMPOSITION
William C. Berry, Jr., Crestwood, Mo., assignor to Interchemical Corporation, New York, N.Y., a corporation of Ohio
No Drawing. Filed July 15, 1964, Ser. No. 382,948
17 Claims. (Cl. 260—30.6)

ABSTRACT OF THE DISCLOSURE

A method of calking which employs a novel calking composition comprising a premixture of polychloroprene and a non-volatile plasticizer for polychloroprene. Prior to use a polyfunctional amine accelerator is added and the composition is cured by heat.

---

This invention relates to a novel method of calking. This method is of particular importance when used in the mass production assembling of automobiles to calk the joints between window glass and the steel frames of the automobile bodies in which the glass is to be fixed.

In the conventional "assembly-line" production of automobile bodies, in the majority of cases the fixed window glass, e.g., front and rear windshields, is held within the steel window frame by means of a preformed rubber gasket. Because of a continuing demand in the automotive industry for reduction of assembly line costs, calking methods have been sought as a replacement for the gasket means of fixing the window glass within the frame. However, the only calking methods which have been found to be commercially operable in such assembly line production involve the use of polysulfide type rubber calking compounds. Such polysulfide calking methods have not gained wide acceptance in automobile assembly because the cost of the calking compounds is sufficiently high—it is higher in cost than the conventional preformed gasket—to offset a large proportion of the savings due to the greater efficiency of the calking operation in the installation of window glass.

We have now discovered a novel method of calking using polychloroprene (Neoprene) which is substantially lower in cost that the method using the polysulfide. Because of this reduced cost, our calking method should be economically feasible in a great portion of the automobile assembly industry.

Our novel method involves the use of a stable and storable premixture of a low molecular weight (2,000 to 18,000) polychloroprene and primary plasticizer for said polychloroprene, the plasticzer content being from 100% to 200% by weight of the polychloroprene content. Just prior to use on the "assembly line," the premixture is mixed with an accelerator, a polyfunctional amine selected from the group consisting of piperazine and amines having the formula $NH_2-C_2H_4-(NHC_2H_4)_n-NH_2$, where $n$ is an integer from 0 to 4, the amine added being equal to from 12 to 20 parts by weight per hundred parts of the polychloroprene. The admixture is then applied to the joints in the window glass and frame assembly preferably by means of a calk gun.

Almost immediately after application, the calking composition is retentive of its shape and within 10 to 30 minutes at room temperature (40°–100° C., most preferably 65°–85° C.) the calking composition reaches its gelling point, that is it is no longer distortable. This is a very important property in assembly line production. In such production, it is often necessary to affix metal strips or materials to the calking composition as soon as possible. During the application of such strips, substantial amounts of pressure are exerted against the calking material. The material must not distort under such pressure; it must be sufficiently resilient to maintain its shape. Since our material has reached its gelling point, it can no longer be worked or distorted. The gelling point is generally defined as the point at which a semi-liquid passes into the solid state. After the gelling point is reached, the calking material proceeds at room temperature to a complete cure forming a resilient, tough, durable calking material which is resistant to oil, water, solvents and weathering. It is also important to note that shortly after the gelling point is reached, our material becomes tack-free. Once the material is tack-free, it will no longer pick up dust or other material from the air.

Most preferably, lead dioxide is added to the premixture together with the polyfunctional amine. The lead dioxide enhances the cure of the calking composition and increases the rate of cure. Preferably no solvent is present in our calking composition, although small amounts of solvent in the order of 1 to 2% of the composition weight may be used if desired for certain applications.

While there has been some suggestion in our prior art low molecular weight Neoprene (polychloroprene) is sufficiently flowable to be used as a calking composition, there has been no suggestion of a practical method of utilizing such polychloroprene as a calking compound in the production of automobiles. The primary problem is the use of polychloroprene for calking in automobile production is that the calking composition must become non-distortable in a matter of minutes at room temperature. As previously mentioned, the material must be sufficiently resilient to withstand the pressures of metal strips while retaining its shape; it must have reached its gelling point. Previous attempts at Neoprene calking compositions resulted in material which did not reach their gelling points and consequently remained deformable even after room temperature cures of 12 to 24 hours. This would be obviously unacceptable for automobile assembly where the total time for assembly of the entire automobile body is usually 4 to 7 hours.

Surprisingly, we have found that by using large amounts of primary plasticizer in the premixture (100% to 200% of the weight of polychloroprene) in combination with a low molecular weight polychloroprene and by using the polyfunctional amine accelerator in high proportions (12 to 20% of the weight of polychloroprene) beyond conventional limits, it is possible to produce a calking material which reaches its gelling point rapidly in the order of from 10 to 30 minutes and the cures at room temperature to a resilient, tough and resistant seal.

Polyfunctional amines which give excellent results in the practice of this invention are aliphatic amines such as ethylene diamine, diethylene triamine, triethylene tetraamine, pentaethylene hexamine and particularly tetraethylene pentamine as well as piperazine including substituted piperazines such as 2-methyl piperazine and N-aminoethyl piperazine. All of these amines give calking compositions having gelling point times of less than 30 minutes.

While the above polyfunctional amines are preferred in the practice of this invention, other polyfunctional amines such as hexamethylene diamine, N-methyl morpholine and N-N'-2-aminoethyl oxydibenzylamine as well as condensation products of polyfunctional amines and higher fatty acids sold under the Versamid trademark yield good calking compositions for uses where a 30 minute gelling time is not required.

The time for reaching the gelling point and the quality and rate of the cure are even further enhanced by the inclusion of lead dioxide in the additive composition together with the tetraethylene pentamine. Preferably the weight of lead dioxide added constitutes from 2 to 20 parts per hundred parts of the polychloroprene and most preferably from 3 to 7 parts per hundred parts of polychloroprene of the weight.

A significant aspect of this invention is that we have no zinc oxide or other metallic oxide catalyst in our premixture. Virtually all conventional polychloroprene formulations which are to be stored before use (premixtures) contain such metallic oxides. The zinc oxide is generally considered to be necessary in stored compositions to serve as an acceptor for the HCl released during natural aging. We have found, however, that in our compositions, probably due to the large amount of plasticizer present, zinc oxide in the premixture has a very adverse effect on our calking method. The premixture containing zinc oxide is highly unstable and undergoes curing while it is being stored. Consequently, it has substantially no shelf life. When we use zinc oxide or any other metallic oxide, we include it in our additive composition which is admixed with the premixture just prior to use.

Another component of conventional Neoprene premixtures which we find to be detrimental to our method is a rubber antioxidant of the Neozone A type (phenyl-α-naphthylamine). This component, which is supposed to give conventional premixtures a high degree of resistance to natural aging, has a very adverse effect on our method. It also causes the premixture to become unstable and to undergo curing while it is being stored. A premixture, containing phenyl-α-naphthylamine also has substantially no shelf life.

The premixtures used in this invention may further include any of the conventional fillers for Neoprene rubber, including carbon black, clay, talc, calcium silicate, silicon dioxide, whiting, calcium carbonate, calcined clay and magnesium silicate. The fillers are present in the proportions that they are conventionally present in Neoprene rubber, preferably in the order of 0.5 to 3 parts and most preferably from 1 to 2.5 parts of filler for each part of Neoprene rubber present.

In addition, other conventional Neoprene rubber additives may be included in the premixture.

The polychloroprene rubber used has a low molecular weight, 2,000 to 18,000 and may either be of the type which contains no interpolymerized sulfur and incorporated tetraalkyl thiuram disulfide or of the type which contains these incorporated materials. The latter type includes a small proportion under 5%, most preferably from 0.25% to 2% of interpolymerized sulfur and under 1%, preferably from 0.3% to 0.6% of incorporated tetraalkyl thiuram disulfide based upon the weight of the polychloroprene. The tetraalkyl thiuram disulfide is preferably tetramethyl or tetraethyl thiuram disulfide.

The premixture, preferably, also contains an epoxy resin which acts to improve the adhesion of the calking composition to the surfaces being calked. The epoxy resin also acts to enhance the curing and the rate of gelling of the calking composition. Most preferably the polyepoxide resins are of the type made by the reaction of a polyhydric phenol, particularly 2,2-bis(4-hydroxyphenyl) propane with epichlorohydrin in accordance with the procedure of U.S. Patent 2,633,458. By regulating the proportions of the two reactants, the molecular size and molecular structure of the polyepoxide resins may be controlled. By using an excess of epichlorohydrin, a low molecular weight polyepoxide resin may be produced. By increasing the amount of 2,2-bis(4-hydroxyphenyl) propane, a higher weight polyepoxide resin may be produced. The polyepoxide resins produced by the reaction of epichlorohydrin and 2,2-bis(4-hydroxyphenyl) propane may in addition be esterified with vegetable oil fatty acids including coconut acids, cottonseed acids, dehydrated castor fatty acids, linseed oil fatty acids, oiticia fatty acids, soy acids, and tung fatty acids.

Other polyepoxide resins which may be used in place of the above polyepoxide resins are the epoxidized polymers and copolymers of diolefins, such as butadiene. Examples of these include, among others, butadiene-acrylonitrile copolymers (Hycar rubbers), butadiene styrene copolymers and the like. Still, others which may be used include epoxidized polyethylenically unsaturated hydrocarbons, such as epoxidized 2,2-bis(2-cyclohexenyl) propane, epoxidized vinyl cyclohexene and epoxidized dimer of cyclopentadiene and epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol.

Preferably from 0.1 to 1 part and most preferably from 0.15 to 0.4 part of polyepoxide are added for each part of polychloroprene.

While polyepoxides are the preferred additives for aiding adhesion, other resins compatible with polychloroprene may be used to the same end. Such resins include coumaroneindene resins, rosin oils, rosin, polyester resins, phenolic resins such as phenol formaldehyde resins, resorcinol-formaldehyde resins, acrylic resins such as acrylic esters, polyurethane resins and triazine-formaldehyde resins.

The plasticizer should be a non-volatile primary plasticizer for the polychloroprene. Primary plasticizers are characterized as being solvents for the polychloroprene. For practical purposes a plasticizer which does not exude from the plasticized composition after repeated flexing or on long standing is considered to be a primary plasticizer. Accordingly, since the present invention employs high concentrations of plasticizer at least equal in weight to that of the polychloroprene, primary plasticizers for the polychloroprene are those which do not exude when used in such high proportions.

Preferably the primary plasticizers are the esters of the higher fatty acids, that is fatty acids having from 12 to 18 carbons; most preferably the fatty acids are unsaturated, e.g., oleic acid. The alcohol component of the ester is preferably an alkanol. Examples of preferred esters are butyl oleate, ethyl oleate and methoxy ethyl oleate. Other operable esters are glyceryl oleate, n-butyl stearate and methylcyclohexanol stearate.

Other plasticizers which may be used in the practice of this invention are esters of phthalic acid, particularly diesters of phthalic acid and aliphatic alcohols including dioctyl phthalate (diisooctyl phthalate and di - n - odyl phthalate), dimethyl phthalate, diethyl phthalate, diamyl phthalate, dilauryl phthalate, and diallyl phthalate as well as dimethylcyclohexanol phthalate. Adipates such as dibutyl adipate, dioctyl adipate and di-butoxy ethyl adipate may also be used as well as sebacates. Likewise phosphates such as tri-butylglycol phosphate may also be used.

Another group of desirable plasticizers are the chlorinated biphenyls having anywhere from one chlorine group (monochlorodiphenyl—18% chlorine content) to ten chlorine groups (decachlorodiphenyl—71.1% chlorine content) these are available commercially under the Aroclor trademark. In addition, petroleum oil plasticizers, particularly aromatic petroleum oil plasticizers may be used as may vegetable oils.

While the method of calking of this invention has been described as particularly advantageous in the assembly line production of automobiles, the same method may be used in virtually any calking and sealing operation in which a room temperating curable calking composition is desired, e.g., architectural calking compounds and potting compounds.

The following examples will illustrate this invention:

EXAMPLE 1

| | Parts by weight |
|---|---|
| Neoprene FB (polychloroprene having an average molecular weight of 8,000 to 12,000 and containing 2% interpolymerized sulfur and 0.6% incorporated tetraethyl thiuram disulfide based upon the weight of the polychloroprene) | 100 |
| Butyl oleate | 100 |
| Calcium carbonate filler | 100 |
| Silicon dioxide filler | 6 |
| Lampblack filler | 10 |
| Kenflex A (the condensation polymerization product of paraformaldehyde and di- and trimethyl benzene having a molecular weight of 400) | 30 |

The above composition is mixed on a high shear mixer (Baker-Perkins mixer) for a period of 1 to 2 hours at a temperature of 110° to 130° F. Then the mixture is stored until the time that it is to be applied. At this time, 15 parts of tetraethylene pentamine are added to the composition and the admixture stirred until uniform. The admixture at a temperature of 77° F. is then applied with a calking gun to the point of contact between a steel window frame and a window glass engaged within said frame in an unfinished automobile body. The calking composition is allowed to remain for 20 minutes at room temperature, 77° F. The resulting calked joint between the metal and glass is firm, resilient and cannot be changed in shape, worked or distorted by the application of pressure. It displays excellent adhesion to both the metal and glass.

EXAMPLE 2

Example 1 is repeated using the same conditions, ingredients and proportion except that in place of Neoprene FB, there is used Neoprene FC polychloroprene having a molecular weight of 8,000 to 12,000 but containing no interpolymerized sulfur or tetraethyl thiuram disulfide. The results are substantially the same as those of Example 1.

EXAMPLE 3

| | Parts by weight |
|---|---|
| Neoprene FB | 100 |
| Aroclor 1242 (chlorinated biphenyl containing 42% chlorine) | 100 |
| Calcium carbonate | 100 |
| Silicon dioxide | 6 |
| Epon 828 (polyepoxide resin—the reaction product of 2,2-bis(4-hydroxyphenyl) propane and epichlorohydrin, having a molecular weight of 350, an epoxide equivalent weight of 175 to 210 and an average of almost 2 epoxy groups per molecule) | 30 |

The above composition is mixed in accordance with the procedure and conditions of Example 1. After which, a mixture of 15 parts of tetraethylene pentamine and 15 parts of lead dioxide is added and the admixture is stirred until uniform. The admixture is then applied to the window and frame joints of Example 1 in accordance with the procedure of Example 1. The resulting calked joints have all of the desirable properties of the joints in Example 1.

EXAMPLE 4

Example 3 is repeated using the same conditions, proportions and ingredients except that in place of Neoprene FB, Neoprene FC is used. The results are substantially the same as those of Example 1.

EXAMPLE 5

| | Parts by weight |
|---|---|
| Neoprene FB | 100 |
| Diiso-octyl phthalate | 200 |
| Calcium carbonate | 100 |
| Talc filler | 75 |
| Silicon dioxide | 6 |
| Epon 828 | 30 |

The above composition is mixed in accordance with the procedure and conditions of Example 1. After which a mixture of 15 parts tetraethylene pentamine, 15 parts of lead dioxide and 10 parts of zinc oxide are added and the mixture stirred until uniform. The admixture is then applied with a calking gun to the point of contact between a steel window frame and a window glass engaged within said frame in an unfinished automobile body. The calking composition reaches its gelling point in 30 minutes at room temperature, 77° F. The resulting calked joint has all of the desirable properties of the joint of Example 1.

EXAMPLE 6

Example 5 is repeated using the same conditions and ingredients except that in place of the Neoprene FB, Neoprene FC is used. The results are substantially the same as in Example 5.

EXAMPLE 7

| | Parts |
|---|---|
| Neoprene FFB | 100 |
| Butyl oleate | 100 |
| Calcium carbonate | 100 |
| Silicon dioxide | 6 |
| Epon 828 | 30 |
| Kenflex A | 30 |

The above composition is mixed in accordance with the procedure and conditions of Example 1. After which, a mixture of 12 parts tetraethylene pentamine, 15 parts of lead dioxide, 10 parts of zinc oxide and 20 parts of diisooctyl phthalate is added and the admixture is stirred until uniform. The admixture is then applied to the window and frame joints of Example 1 in accordance with the procedure of Example 1. The resulting calked joints have all of the desirable properties of the joints of Example 1 except that the gelling time is only 12 minutes.

EXAMPLES 8-11

Example 1 is repeated using the same procedure, ingredients, proportions and conditions except that in place of tetraethylene pentamine, each of the following polyfunctional amines is used:

Example 8—Ethylene diamine
Example 9—Diethylene triamine
Example 10—Piperazine
Example 11—2-methyl piperazine The results are the same as those in Example 1 except that the time in which the calked joint becomes sufficiently set so that it may not be distorted by pressure varies slightly but in no instance exceeds 30 minutes.

EXAMPLES 12-14

Example 3 is repeated using the same procedure, ingredients, proportions and conditions except that in place of tetraethylene pentamine, each of the following polyfunctional amines is used;

Example 12—Triethylene tetramine
Example 13—Pentaethylene hexamine
Example 14—N-aminoethyl piperazine The results are the same as those in Example 3 except that the time in which the calked joint becomes sufficiently set so that it may not be distorted by pressure varies slightly but in no instance exceeds 30 minutes.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:
1. A method of calking which comprises premixing 100 parts of polychloroprene having a molecular weight of from 2,000 to 18,000 with 100 to 200 parts of a nonvolatile primary plasticizer for the polychloroprene which are esters of the higher fatty acids, esters of phthalic acid, esters of adipic acid, esters of sebacic acid, phosphates, chlorinated biphenyls or petroleum oil plasticizers, then admixing from 12 to 20 parts of a polyfunctional amine selected from the group consisting of piperazine and amines having the formula $$NH_2-C_2H_4-(NHC_2H_4)_n-NH_2)$$

where $n$ is an integer from 0 to 4 with said premixture, immediately applying said admixture to the area to be calked and permitting the applied admixture to cure at a temperature of from 40° to 100° F. for a period of from 10 to 30 minutes, at which point the gelling point of the admixture is reached.

2. A method of calking which comprises premixing 100 parts of polychloroprene having a molecular weight of from 2,000 to 18,000 with 100 to 150 parts of a non-volatile primary plasticizer for the polychloroprene which are esters of the higher fatty acids, esters of phthalic acid, esters of adipic acid, esters of sebacic acid, phosphates, chlorinated biphenyls or petroleum oil plasticizers, then admixing from 12 to 20 parts of a polyfunctional amine selected from the group consisting of piperazine and amines having the formula $$NH_2-C_2H_4-(NHC_2H_4)_n-NH_2$$

where $n$ is an integer from 0 to 4 and from 2 to 20 parts of lead dioxide with said premixture, immediately applying said admixture to the area to be calked and permitting the applied admixture to cure at a temperature of from 40° to 100° F. for a period of from 10 to 30 minutes, at which point the gelling point of the admixture is reached.

3. The method of claim 1, wherein said amine is tetraethylene pentamine.

4. The method of claim 1, wherein said amine is piperazine.

5. The method of claim 2, wherein up to 10 parts of zinc oxide are added to the premixture simultaneously with the addition of the lead dioxide.

6. The method of claim 3 wherein said polychloroprene contains a small proportion of interpolymerized sulfur and from 0.3% to 0.6% of incorporated tetraalkyl thiuram disulfide based upon the weight of the polychloropene.

7. The method of claim 1 wherein said premixture further includes a polyepoxide resin.

8. The method of claim 7 wherein said polyepoxide resin is the reaction product of a polyhydric phenol and epichlorohydrin.

9. The method of claim 3 wherein said plasticizer is an ester of a higher fatty acid.

10. The method of claim 9 wherein said ester is n-butyl oleate.

11. The method of claim 3 wherein said plasticizer is a diester of an aliphatic alcohol and phthalic acid.

12. The method of claim 11 wherein said plasticizer is dioctyl phthalate.

13. The method of claim 3 wherein said plasticizer is chlorinated biphenyl.

14. In automobile body assembling, the method of calking the joints between a window glass and a steel window frame which comprises premixing 100 parts of polychloroprene having a molecular weight of from 2,000 to 18,000 with 100 to 200 parts of a non-volatile primary plasticizer for the polychloroprene which are esters of the higher fatty acids, esters of phthalic acid, esters of adipic acid, esters of sebacic acid, phosphates, chlorinated biphenyls or petroleum oil plasticizers, then admixing from 12 to 20 parts of a polyfunctional amine selected from the group consisting of piperazine and amines having the formula $NH_2-C_2H_4-(NHC_2H_4)_n-NH_2$, where $n$ is an integer from 0 to 4 with said premixture immediately applying said admixture to the joints and permitting the applied admixture to cure at a temperature of from 40° to 100° F. for a period of from 10 to 30 minutes, at which point the gelling point of the admixture is reached.

15. In automobile body assembling, the method of calking the joints between a window glass and a steel window frame which comprises premixing 100 parts of polychloroprene having a molecular weight of from 2,000 to 18,000 with 100 to 150 parts of a non-volatile primary plasticizer for the polychloroprene which are esters of the higher fatty acids, esters of phthalic acid, esters of adipic acid, esters of sebacic acid, phosphates, chlorinated biphenyls or petroleum oil plasticizers, then admixing from 12 to 20 parts of a polyfunctional amine selected from the group consisting of piperazine and amines having the formula $NH_2-C_2H_4-(NHC_2H_4)_n-NH_2$, where $n$ is an integer from 0 to 4 and from 2 to 20 parts of lead dioxide with said premixture, immediately applying said admixture to the joints and permitting the applied admixture to cure at a temperature of from 40° to 100° F. for a period of from 10 to 30 minutes, at which point the gelling point of the admixture is reached.

16. The method of claim 14, wherein said amine is tetraethylene pentamine.

17. The method of claim 14, wherein said amine is piperazine.

References Cited
UNITED STATES PATENTS

| | | | |
|---|---|---|---|
| 2,929,794 | 3/1960 | Simon et al. | 260—31.8 |
| 2,929,805 | 3/1960 | Tann | 260—41.5 |
| 2,718,664 | 9/1955 | Schweitzer. | |
| 3,077,638 | 2/1963 | Hickam. | |
| 3,098,698 | 7/1963 | Glynn. | |

ALLAN LIEBERMAN, *Primary Examiner.*